Patented May 19, 1936

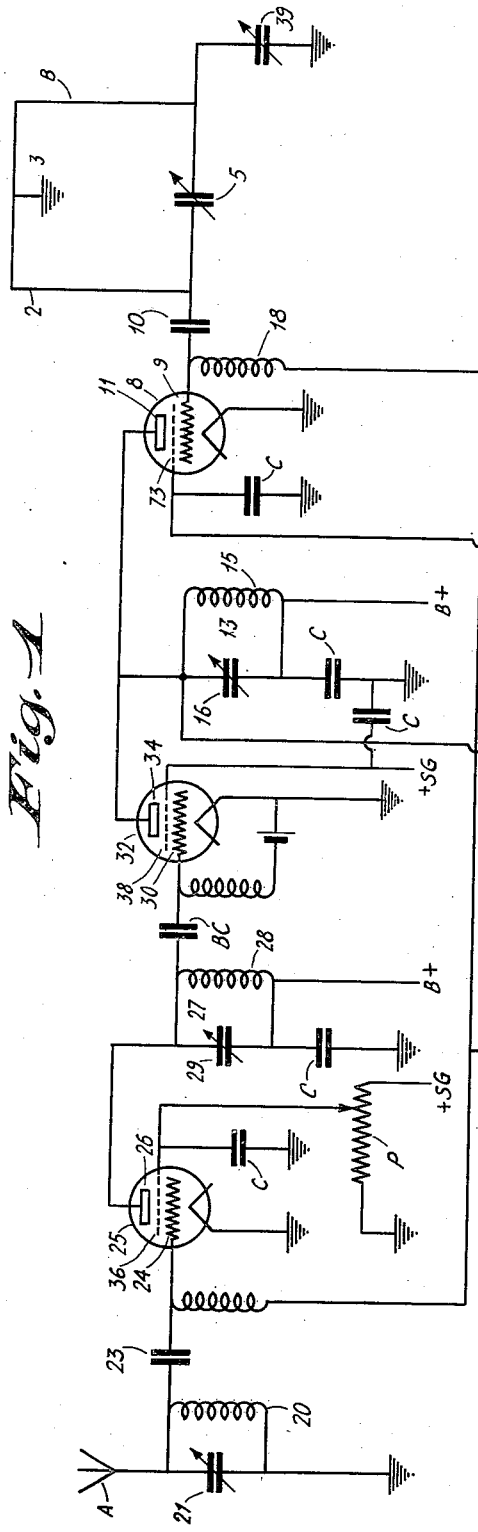

2,040,952

UNITED STATES PATENT OFFICE 2,040,952

DIRECTIONAL RECEIVER

Harold O. Peterson, Riverhead, N. Y., assignor to Radio Corporation of America, a corporation of Delaware Application November 1, 1932, Serial No. 640,578

18 Claims. (Cl. 250—11)

The present invention relates to a method of and means for directional signalling, and is particularly adaptable to the navigation of ships and aircraft.

It is especially desirable in the navigation of aircraft to have available a visual indicating means for determining the direction in which the aircraft is headed. Some use has been made of a simple loop antenna type of direction finder such as regularly used on board ships. These loop direction finders have in some instances been mounted in a fixed position, usually crosswise with respect to the ship's fuselage. With this type of equipment the receiver output remains zero when the plane is headed directly towards the transmitting station. The application of automatic volume control with such equipment is obviously difficult. It is furthermore inconvenient to be required to turn the ship in order to determine whether it is on the correct course.

In direction finders known heretofore of the right and left indicating type, the observer could determine his line of flight but could not determine his sense of flight. That is, the observer knew when the receiver was on a line through the transmitting station, but could not determine whether the plane was headed toward or away from the station.

Broadly, the primary object of the present invention is to provide a system to overcome the difficulties enumerated above and others.

The novel features of the invention have been pointed out with particularity in the claims appended hereto.

The present novel system and its mode of operation will be understood from the following description when read in connection with the accompanying drawing, wherein:

Figure 1 shows the circuit arrangement of the present directional receiver; while, Figure 2 shows the preferred position of the receiver in the plane.

Referring to Figure 1, it will be seen that the present system comprises two receiving antennae A and B, of which the antenna A is non-directional and the antenna B is directional in its signal absorbing characteristics.

The loop antenna B, which comprises one or more turns 2 of conducting material symmetrically grounded at 3 and tuned to signal frequency by a variable capacity 5, is normally situated crosswise to the fuselage of the airship and therefore receives minimum induced voltage when the airship is headed toward or from the transmitting station. The signal voltage produced across the terminal of the loop B, due to the magnetic lines of force in the wave-front, is applied by way of blocking condenser 10 to the control grid electrode 9 of thermionic amplifier 8. The amplifier 8 may be of any type but, since it serves a double function, as will appear more in detail hereinafter, is of the screen grid type. The signal oscillations are repeated and amplified in the tube 8 and appear on the anode 11 thereof, from whence they are fed to the signal resonance circuit 13 comprising the inductance 15 and variable capacity 16. Biasing potential for the electrode 9 of tube 8 is supplied by way of an impedance 18 from a source in a manner which will be described more in detail hereinafter. Charging potential for the anode 11 of tube 8 is supplied by way of inductance 15 from a source of potential not shown.

The vertical antenna A, which may be tuned to the signal frequency by means of the inductance 20 and parallel variable capacity 21, is non-directive and absorbs approximately equal signal voltages for all positions of orientation of the airship. The signal voltage oscillations appearing at the terminals of the resonance circuit 21, 20 are impressed by way of coupling condenser 23 to the control grid electrode 24 of thermionic amplifier 25. The signal voltages are amplified and repeated in amplifier 25 and appear on the anode electrode 26 thereof, from whence they are impressed upon the circuit 27 comprising inductance 28 and variable capacity 29 in parallel therewith. The amplified and repeated signal voltages appearing in the tank circuit 27 are impressed therefrom by way of blocking and coupling condenser BC to the control electrode 30 of a second thermionic amplifier 32. The signal oscillations impressed on the control electrode 30 of tube 32 are repeated and amplified in tube 32 and appear on the anode electrode 34 thereof, from whence they are applied to the tank circuit 13 described hereinbefore. I have now shown means whereby signal voltages absorbed by the loop and by the non-directional aerial A are caused to appear in the common circuit 13.

The thermionic amplifier 25 may be of any type but is preferably of the screen grid type since the use of a screen grid tube at this point permits manual control to a certain extent of the amplification factor of this tube and therefore manual control of the volume of the signals relayed by the tube from the non-directional antenna system to the circuit 13. When a screen grid tube is used the screen grid electrode 36 thereof may be connected as shown to a point on a potentiometer P, one terminal of which is connected to ground and the other terminal of which is connected to a point on the potential source supplying anode potential to the tubes 39 and 8.

The amplifier 32 may be of any type. Preferably, this amplifier is also of the screen grid type and charging potential for the screen grid electrode 38 thereof may be supplied from the common source by way of a lead, as indicated.

Anode potential for the tubes 25 and 32 may be supplied by way of inductances 28 and 15 respectively from the source which supplies anode potential for the tube 8. Radio frequency oscillations may be shunted around the sources by connecting the screen grid electrodes and also the low potential terminals of the radio frequency circuits 27 and 13 to ground by way of by-passing condensers C, as shown.

To insure that the directional signals absorbed by the loop B are truly representative of the direction of the source from the receiver, the loop B must be symmetrically arranged with respect to ground. In this case symmetry is assured, first, by the connection 3 between the electrical center of the absorbing member 2 and ground. Any unbalancing of the loop with respect to ground, due to the effect of the capacitive elements in the form of the receiver circuits connecting tube 8 to the loop, is compensated by means of a balancing variable capacity 39 connected between a terminal of the loop and ground.

As is well known, the voltages absorbed by a loop from a signal wave are 90° out of phase with respect to the voltages in the wave, whereas the signal voltages absorbed by a non-directional aerial from a signal wave are 180° out of phase with respect to the voltages in the wave. The signal voltages absorbed by the non-directional antenna and by the loop can not be directly combined since they are not in phase. In order that the voltages from the antenna and from the loop may be combined, it is necessary to cause a 90° phase shift of the voltages from one of the antennae and to cause this phase shift in the proper direction. In accordance with the present invention a 90° phase shift is introduced into the signal voltages from the vertical antenna by means of the phase changing element 27. This shift in phase can be accomplished readily in a simple manner since all that is necessary is to provide an anode load impedance in the external circuit equivalent to the inductive or capacitive reactance of the tube. In the circuit 27 the external anode load is a capacitive reactance in effect. Moreover, this shift in phase in the current from the non-directional aerial may be accomplished, as shown, in any manner. For example, it may be accomplished as shown in United States Patents No. 1,724,246 and No. 1,755,180.

The combined signal voltages appearing in the circuit 13 are applied by way of lead 40 and blocking condenser 41 to the control electrode 42' in a radio receiver 43. The radio receiver includes signal amplifying means and the selective circuits necessary to insure that only the signal desired is passed by the radio receiver circuit.

In other instances where greater selectivity is desired, audio frequency selectivity may be utilized. In case it is desired to have the receiver particularly responsive to transmission from a given transmitter, the transmitter may be tone modulated at a characteristic frequency. In this case the radio receiver 42 rectifies the modulated carrier producing the signal modulation frequency which may be sent through any known selective circuit, such as vibrating reeds, as disclosed in Kline, United States Patent No. 1,827,590, or tuned electrical filter circuits. The signal oscillations or modulations derived from the output of the receiver 42 are impressed onto the control electrode 43 of a thermionic rectifier 44. The thermionic rectifier converts the signal voltages, which may be alternating in effect, into unidirectional current pulsations in the anode circuit of the rectifier 44. The anode electrode 45 of tube 44 is connected, as shown, by way of a charging source 46 and a direct current meter M to a pair of series resistances 48 and 49 and to the cathode 50' of tube 44 by way of ground. The resistance 49 is connected in parallel with a capacity 50. The unidirectional current passed through the resistance 49 is applied by the lead 20 AVC to the control electrodes 9 and 24 of tubes 8 and 25 respectively and provides automatic volume control of the signal gain in said tubes. The capacity 50 and the resistance 49 is what is known as a time control circuit and determines the speed of action of the automatic volume control. In other words, the delay in time, in which a surge in signal strength in the current in the rectifier 45 results in a change of potential on the control grids of the amplifiers 8 and 25, may be determined by the constants of the circuit 50, 49. The operation and function of this automatic volume control including the circuit 50, 49 which has a suitable time constant, is well known in the prior art and is described in detail in Debellescize, United States Patent No. 1,867,139. Hence a detailed description thereof is thought unnecessary at this point. Especially is this so since volume control per se forms no part of the present invention. The purpose of the automatic volume control AVC and time constants circuit 49, 50 is to insure that the pointer H of meter M is maintained somewhere intermediate the ends of the scale, preferably at about midscale position, independently of the strength of the signal reaching the antennae A and B from the signal source.

In order that the operator may have an aural indication of signal strength, the control electrode of an amplifier 52 is connected, as shown, by way of a coupling condenser 53 to the high potential terminal of resistance 48. The amplified pulsations appear on the anode 54 of this tube and are set up in the telephones 56 which are connected between the anode 54 and the cathode 57 of amplifier 52 by way of ground.

If in operation the loop B is turned from a position directly crosswise of the aircraft, or to the line of direction through the transmitter at which no signal is absorbed, a voltage will be induced in the loop since some of the lines of force in the wave-front thread the vertical members of the loop. The direction of this induced voltage will depend upon which way the loop is turned. Thus, with respect to the grid of tube 25, the voltage output of this tube will in this case be 180° different than the voltage output in case the loop is turned in the opposite direction from the position of minimum or zero reception. Since the signal voltage impressed on the common circuit 13 from the vertical antenna is in the same phase at all times, the voltage from the loop antenna will oppose the voltage from the vertical antenna in the circuit 13 if the loop is turned in one direction, but will add cumulatively with said voltage from the vertical antenna if the loop B is turned in the other direction.

In the operation of this system it is intended that the gain or amplifying characteristic of the amplifying coupling tube 8 be periodically changed by a considerable amount for a relatively short duration of time. If the gain of the coupling tube 8 is suddenly changed there will be a surge or abrupt falling off of signal voltage supplied by the coupling tube 8 to the common circuit 13. This will result in a sudden increase or decrease of the voltages in the tank circuit because, as pointed out hereinbefore, the phase of the changes resulting from the signal absorbed by the non-directional antenna has been shifted by 90° so that said voltages either add or subtract with the voltages from the loop in the common circuit 13. This resultant voltage is applied to the receiver 42 over line 49 and this surge or decrease in voltage in the circuit 13 will result in a sudden deflection of the pointer H of meter M. The direction of this deflection or kick of the pointer H of meter M will depend upon which way the loop was turned from the position of minimum reception since the direction in which the loop is turned determines whether or not the signal voltages add or subtract in the circuit 13. Thus, if the loop B is turned in one direction the pointer H of meter M will be deflected to the right and if the loop B is turned in the opposite direction the pointer H will kick or deflect to the left. By virtue of the automatic volume control device AVC and 49 and 50, the pointer H may be, under normal conditions, kept somewhere near the middle scale, regardless of the signal strength absorbed by the antennae. The time constant of the automatic volume control is made sufficiently slow so that the volume control does not respond to changes of duration as short as the impulses which are to be applied to the screen grid electrode of tube 8 to determine the amplification characteristic or gain control of the coupling tube 8. This arrangement then permits the sudden kicking or deflection action of the meter M to take place but does not permit the pointer H of meter M to respond visibly to automatic volume control action.

The control of the amplification or gain obtained in the coupling tube 8 may be procured in any manner, preferably, as indicated in the drawing. In the preferred form an oscillator of the relaxation type is provided. This oscillator comprises a two-electrode tube having its anode 61 coupled to its cathode 63 by way of a capacity $C_2$ of the proper value. Charging potential for the anode of this tube is supplied by way of a charging resistance $R_2$ and a source 64 connecting said anode to the cathode 63 by way of ground. The low frequency oscillations or surges produced in this tube 60 are supplied by way of blocking condenser 66 and charging resistance 67 to the control electrode 68 of a thermionic amplifier 69. The control electrode 68 of this amplifier is maintained at the desired operating potential by means of a biasing source 70 and a charging resistance 71 connected by way of ground between said control electrode and the cathode of tube 69. The low frequency oscillations or surges produced in 60 are amplified in 69 and appear on the anode 72 thereof, from which they are applied directly to the screen grid electrode 73 of tube 8. These surges or potentials determine the amplification characteristic or gain of this tube and thereby result in the sudden increases or decreases in the resultant voltage in the circuit 13, which variations are utilized in the manner described hereinbefore. Charging potential for the anode 72 of tube 69 is supplied by way of an iron core choking inductance 74 and a source 75 connected between said anode and the cathode of the tube 69. The relaxation oscillator 60 therefore produces a sawtooth wave form which is impressed on the grid of the amplifier tube 69, resulting in unilateral pulses of short duration but of considerable magnitude in the anode circuit reactor 74 of tube 69. These pulses of short duration and considerable magnitude are impressed on the screen grid electrode 73 of tube 8 and thereby modulate the gain of said tube.

Although applicant has shown several potential sources for the various thermionic tubes in this system, it will be understood that a single source or a less number of sources than shown may be utilized without departing from the spirit of the invention.

By means of this device a pilot is not only enabled to determine which way the heading of the ship has changed from the direction of the transmitter, but also to determine whether he is headed toward or away from the transmitter. This can be determined by steering the ship so as to produce no kicks of the pointer H of meter M. To do this the ship is headed along the line of transmission. Then the ship may be purposely turned slightly to the right, for instance. This changes the sign of the signal voltage picked up by the loop and applied to 13. It will then be observed that the kicks of pointer H of the meter M will be toward the right. If the device is properly coordinated it may then be assumed that the ship is headed towards the transmitter. If with the same coordination the ship were headed away from the transmitter, the same maneuver would cause the kicks of the pointer H of meter M to be toward the left.

In a modification of this system a loop antenna, positioned at right angles to the loop B, may be substituted in place of the vertical antenna A. In this case the phase correcting circuit 27 is not necessary. This modification would, however, not be responsive to sense, that is, the pilot would not be able to tell whether he is traveling toward or away from the transmitter.

It is also apparent that other directive antenna systems may be substituted for the loop. For example, a system such as shown in British Patent No. 130,490 may be used.

The audio amplifier 52 is provided in this system to enable the pilot to listen to the signal if he desires to do so. He may thus be better able to determine that his apparatus is functioning properly and to identify stations to which he is tuned.

The normal position of the pointer H of the meter M will change slowly with change of the field strength of the signal. This hand may therefore afford a means for estimating the distance between the ship and the transmitter. The plate current drawn by tubes 25 and 8 will also change with a change in the field strength of the signal and a meter inserted in either one of these plate circuits will afford the pilot a very practical means for estimating the distance between his ship and the transmitter.

While the loop B has been spoken of as being positioned crosswise to the fuselage of the airship, it may in some cases be desirable to provide means for adjusting its orientation to some other position. If the loop is in some other position the ship may be guided along a course other than that directly toward or away from the transmitter.

Having thus described my invention and the operation thereof, what I claim is:

1. Directional receiving apparatus comprising, in combination, a non-directional aerial, a directional aerial, a signal combining circuit connected with both of said aerials to receive energy therefrom, means for interrupting periodically the transfer of energy by one of said aerials to said combining circuit, and means for utilizing the energy flowing in said combining circuit for producing indications.

2. Unidirectional receiving apparatus comprising, in combination, a non-directional aerial, a directional aerial, signal combining means connected with both of said aerials to receive energy therefrom, phase shifting means in one of said connections, means for periodically preventing the transfer of energy by one of said aerials to said combining circuit, and means for utilizing the energy flowing in said combining circuit for producing indications.

3. Directional receiving apparatus comprising, a non-directional aerial system and a directional aerial system, a combining circuit, amplifying means interposed between each of said aerial systems and said combining circuit, phase shifting means in one of said amplifying means, amplitude control means connected with one of said amplifying means, said control means being operative to periodically render said amplifying means conducting and non-conducting, and indicating means connected with said combining circuit.

4. Directional receiving apparatus comprising, a non-directional aerial system and a directional aerial system, a combining circuit, thermionic amplifying means interposed between each of said aerial systems and said combining circuit, amplitude control means connected with one of said thermionic means, said control means being operative to periodically render said thermionic means conducting and non-conducting, and indicating means connected with said combining circuit.

5. Directional receiving apparatus comprising, in combination, a non-directional aerial, a directional aerial, signal combining means connected with both of said aerials to receive energy therefrom, means for interrupting periodically the transfer of energy by one of said aerials to said combining circuit, and visual indicating means connected with said combining means for producing indications.

6. Directional indicating apparatus of the right and left indicating type comprising, a directional aerial system, a non-directional aerial system, a combining circuit, thermionic relaying means connecting one of said aerials to said combining circuit, said relay means including phase changing means, a thermionic relay connecting the other of said aerials to said combining circuit, means for determining the conductivity of said last named thermionic relay periodically at a low rate, receiving means connected with said combining circuit, and indicating means connected with said receiving means.

7. Unidirectional indicating apparatus of the right and left indicating type comprising, a directional aerial system, a non-directional aerial system, a combining circuit, thermionic relaying and amplifying means connecting one of said aerials to said combining circuit, said relaying and amplifying means including phase changing means, a thermionic relay amplifier connecting the other of said aerials to said combining circuit, thermionic means for determining the conductivity of said last named thermionic relay periodically at a low rate, receiving means connected with said combining circuit, rectifying means connected with said receiving means, and indicating means connected with said rectifying means.

8. Direction finding apparatus of the right and left indicating type comprising, a directional antenna, a non-directional antenna, a combining circuit, thermionic amplifying means and phase shifting means connecting one of said antennae to said combining circuit, a thermionic amplifier connecting the other of said antennae to said combining circuit, means for varying periodically at a slow rate the amplification factor of said last named thermionic tube comprising, a source of low frequency oscillations of considerable magnitude, means for applying current produced by said oscillations to an electrode of said last named thermionic tube, receiving means coupled to said combining circuit, and indicating means coupled to said receiving means.

9. Directional apparatus of the right and left indicator type comprising, a directional antenna, a non-directional antenna, a combining circuit, a thermionic relay, a phase shifting circuit coupled thereto, means for coupling said relay and said phase shifting circuit to said non-directional antenna and to said combining circuit, a thermionic amplifier connected between said directional antenna and said combining circuit, said thermionic amplifier comprising, a tube of variable internal impedance and means for varying the internal impedance of said tube comprising, a source of low frequency oscillations of considerable amplitude, a thermionic amplifier coupled thereto, a connection between the output electrode of said amplifier and the internal impedance of said coupling tube between said loop and said coupling circuit, rectifying means connected with said coupling circuit, said rectifying means having a resistance in the output circuit thereof, an automatic volume control means connected between said resistance and said thermionic tubes coupling said antennae to said combining circuit, and indicating means connected with said rectifier.

10. The combination with a non-directional aerial, a loop aerial and a combining circuit connected with both of said aerials to receive energy therefrom, of means for periodically interrupting the flow of energy between said loop circuit and said combining circuit, and indicating means connected with said coupling circuit.

11. The method of determining the bearing and sense of direction of a source of signal current which includes the steps of, continuously receiving energy from said source, utilizing said energy to produce energy which is non-characteristic of the direction of said source, utilizing said received energy to periodically produce energy which is characteristic of the direction of said source, shifting the phase of one of the produced energies, combining the produced energies to produce a resultant, rectifying said resultant, and producing indications with said rectified energy.

12. The method of determining the direction of a source of signal current which includes the steps of, continuously receiving energy from said source, utilizing said received energy to produce energy which is non-characteristic of the direction of said source, utilizing said received energy to periodically produce energy which is characteristic of the direction of said source, shifting the phase of one of the produced energies, combining the produced energies to produce a resultant, amplifying said resultant, and using said amplified resultant to produce oral and visual indications of the direction of said source.

13. The method of determining the sense and direction of a source of signalling current which includes the steps of absorbing signal energy to produce a currrent flow, the intensity of which is non-representative of the direction of said source, absorbing signal energy to periodically produce current, the intensity of which is representative of the direction of said signalling source, shifting the phase of one of said produced currents, combining said produced currents to obtain resultant energy, rectifying said resultant energy, and utilizing the rectified energy to produce indications.

14. The method of determining the direction of a source of signalling energy which includes the step of, absorbing signal energy to produce a current flow which is non-representative of the direction of the signalling source, absorbing signal energy to periodically produce a current flow which is representative of the direction of the signalling source, shifting the phase of one of said produced currents, combining said produced currents to produce resultant energy, amplifying said resultant energy, rectifying said resultant energy, and utilizing said rectified energy to determine the intensity of the energy collected and to produce visual indications which are representative of the direction and sense of the signalling source.

15. The method of determining the bearing and sense of direction of a source of signalling energy which includes the step of, producing energy, the character of which is non-representative of the direction of the signalling source, producing energy, the character of which is representative of the direction of the signalling source, shifting the phase of one of said collected energies, periodically interposing one of said energies on the other to modulate the latter, amplifying said modulated energy, rectifying said modulated energy, and utilizing said rectified energy to control the intensity of the energy collected and to produce oral indications which are representative of the direction and sense of the signalling source.

16. The method of determining the direction of a source of signalling energy which includes the step of, producing signal energy, the character of which is non-representative of the direction of the signalling source, producing energy, the character of which is representative of the direction of the signalling source, shifting the phase of one of said produced energies, producing low frequency oscillations, intermittently combining one of said energies with the other at an interrupted rate determined by the frequency of the produced oscillations, amplifying said combined energy, rectifying said amplified energy, and utilizing said rectified energy to determine the intensity of the energy collected and to produce visual indications which are representative of the direction and sense of the signalling source and to produce oral indications which are representative of the direction and sense of the signalling source.

17. The method of determining the direction of a source of signal energy which includes the steps of, receiving energy from said source, utilizing said received energy to produce energy which is non-characteristic of the direction of said source, utilizing said received energy to periodically produce energy which is characteristic of the direction of said source, shifting the phase of one of said produced energies about 90 degrees, and combining the resultant energies to produce a component which is characteristic of the direction of said source.

18. A directional signalling system comprising, a non-directional aerial system, a directional aerial system, signal combining means coupled with both of said aerial systems to receive energy from said aerial system, means for ensuring a predetermined relation between the energies from said aerial systems to be combined in said combining means, means for interrupting periodically the transfer of energy by one of said aerial systems to said combining means, and indicating means connected with said combining circuit for producing indications characteristic of the combined energy.

HAROLD O. PETERSON.